US011946533B2

(12) United States Patent
Shin et al.

(10) Patent No.: US 11,946,533 B2
(45) Date of Patent: Apr. 2, 2024

(54) TWISTED STRING ACTUATOR

(71) Applicant: CHUNGANG UNIVERSITY INDUSTRY-ACADEMIC COOPERATION FOUNDATION, Seoul (KR)

(72) Inventors: Dong Jun Shin, Seoul (KR); Seung Ryeol Lee, Seoul (KR)

(73) Assignee: CHUNGANG UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 153 days.

(21) Appl. No.: 17/413,769

(22) PCT Filed: Jun. 28, 2019

(86) PCT No.: PCT/KR2019/007851
§ 371 (c)(1),
(2) Date: Jul. 29, 2021

(87) PCT Pub. No.: WO2020/141671
PCT Pub. Date: Jul. 9, 2020

(65) Prior Publication Data
US 2022/0049760 A1  Feb. 17, 2022

(30) Foreign Application Priority Data
Dec. 31, 2018 (KR) ......................... 10-2018-0173605

(51) Int. Cl.
*F16H 37/12* (2006.01)
*B25J 9/10* (2006.01)
*F16H 19/06* (2006.01)

(52) U.S. Cl.
CPC ............ *F16H 37/124* (2013.01); *B25J 9/104* (2013.01); *F16H 19/0654* (2013.01)

(58) Field of Classification Search
CPC ...... F16H 19/0654; F16H 37/124; B25J 9/104
(Continued)

(56) References Cited

U.S. PATENT DOCUMENTS 3,864,983 A * 2/1975 Jacobsen ................. F16H 21/54
                                                           623/24
2008/0066574 A1 * 3/2008 Murata ..................... B25J 9/104
                                                           74/826
(Continued)

FOREIGN PATENT DOCUMENTS

DE  102007037376 B3 * 10/2008 .............. B25J 9/104
JP  2008-196566 A     8/2008
(Continued)

OTHER PUBLICATIONS

DE 102007037376 B3 (Harald Staab) Oct. 16, 2008 (full text). [online] [retrieved on Apr. 25, 2023]. Retrieved from: Clarivate Analytics (Year: 2008).*

*Primary Examiner* — Joseph Brown
(74) *Attorney, Agent, or Firm* — NKL LAW; Jae Youn Kim (57) ABSTRACT

The present invention relates to a twisted string actuator. The present invention may comprise: a drive source; driving parts for receiving power from the driving source; driven parts installed in conjunction with the driving parts and receiving power; strings coupled to the ends of the driving parts and the driven parts so as to be twisted or untwisted, and a driving compensation part installed at the ends of the strings to compensate for uneven actuation of each of the strings.

7 Claims, 7 Drawing Sheets

(58) Field of Classification Search
USPC .................................. 74/89.2, 89.21, 89.22
See application file for complete search history.

(56) References Cited

U.S. PATENT DOCUMENTS

2009/0249903 A1* 10/2009 Godler ................ F16H 19/0654
74/89.2
2014/0277739 A1* 9/2014 Kornbluh ................ F16D 28/00
29/428
2018/0298996 A1* 10/2018 Ryu .......................... G01D 5/12

FOREIGN PATENT DOCUMENTS

| KR | 10-1508552 B1 | 4/2015 |
| KR | 10-1779100 B1 | 9/2017 |
| KR | 10-2017-0114538 A | 10/2017 |
| KR | 10-2018-0061460 A | 6/2018 |

* cited by examiner

NUMBER OF BUNDLES: TWO

FIG. 6

NUMBER OF BUNDLES: THREE

FIG. 7

NUMBER OF BUNDLES: FOUR

FIG. 8

NUMBER OF BUNDLES: FIVE

FIG. 9

TWISTED STRING ACTUATOR

TECHNICAL FIELD

The present invention relates to a twisted string actuator, and more particularly, to a twisted string actuator using a twisted string actuation mechanism.

BACKGROUND ART

Twisted string actuation (TSA), which replaces the existing gear, has actively been researched as a technology of safely driving a robot. The TSA is inherently safe because the TSA uses light and inexpensive strings and has flexibility, and many studies on the TSA are being conducted as a driving technology that can be used more safely than a motor in a machine in which humans and robots collaborate.

The design concept of the existing twisted string actuator is generally to increase the length of the string or reduce the radius of the string in order to obtain a high reduction ratio. However, this design concept has limitations in that, when the length of the string is increased, the volume of the actuator is increased, and when the radius of the string is reduced, only a limited design of an allowable load for a mechanical load is possible.

Thus, in order to miniaturize the twisted string actuator, a new operating mechanism is required. That is, the development of a new mechanism with which, when the reduction ratio of the twisted string actuator is increased, the twisted string actuator can be miniaturized by reducing the length of the string while maintaining the allowable load is required.

DISCLOSURE

Technical Problem

The present invention is directed to providing a twisted string actuator having a structure of which an overall size may be minimized by shortening the length of a string used in the twisted string actuator and reducing the radius of the string to increase a reduction ratio of the string.

The present invention is also directed to providing a twisted string actuator having a structure that may compensate for ununiform driving of each bundle of the string and may alleviate an external impact.

Technical Solution

One aspect of the present invention provides a twisted string actuator including a driving source, a driving part that receives power from the driving source, a driven part that is installed to be interlocked with the driving part and receives the power, a string that is connected to ends of the driving part and the driven part to be twisted or untwisted, and a driving compensation unit that is installed at an end of the string and compensates for ununiform driving of the string.

The driving part may be a driving gear connected to an output shaft and rotated, and the driven part may be a pair of driven gears arranged on both sides of the driving gear and engaged with the driving gear.

A driving string connected to an end of the driving gear may be installed in a state of being twisted in a direction opposite to a driven string connected to an end of the driven gear.

A driving string connected to an end of the driving part and a driven string connected to an end of the driven part may be installed in a pre-twisted state so that the twisting and releasing occur in the same direction.

The driving string and the driven string are installed in a state of being twisted in opposite directions.

The driving compensation unit may include an elastic member that provides an elastic force in a direction in which the string is untwisted.

The driving compensation unit may include: a first support plate through which the string passes; a second support plate which is installed to be spaced apart from the first support plate and to which an end of the string is fixed; and an elastic member that has both ends supported between the first support plate and the second support plate, is provided to surround the string, and provides an elastic force in a direction in which the string is untwisted.

The driving compensation unit may include a sensing unit for detecting a load acting on the string.

At least one driven part may be to be interlocked with the driving part and may be disposed radially with respect to the driving part.

The driving part and the driven part may be a driving pulley and a driven pulley, on which a belt is wound, to be to be interlocked with each other.

Advantageous Effects

According to an embodiment of the present invention, an overall size of a twisted string actuator can be minimized by shortening the length of a string used in the twisted string actuator and reducing the radius of the string. The existing twisted string actuator is designed to generally increase the length of the string to obtain a high reduction ratio. However, since the radius of the string as well as the length of the string can be changed using the twisted string actuator according to the present invention, a selection width of the reduction ratio can be widened, and as a result, the reduction ratio can be reduced and an application range of the twisted string actuator can be widened.

Further, an elastic member of a part to which the string is fixed can compensate for ununiform diving of each bundle of the string and alleviate an external impact.

MODES OF THE INVENTION

The present invention may be modified with various changes and have various embodiments, and it is thus intended to illustrate and describe specific embodiments in the accompanying drawings in detail. However, it should be understood that the present invention is not limited to specific embodiments and includes all modifications, equivalents, and substitutes included in the spirit and scope of the present invention. In description of the present invention, when it is determined that the detailed description of widely known related technologies may make the subject matter of the present invention unclear, the detailed description will be omitted.

Terms such as first and second may be used to describe various components, but the components should not be limited by the terms. The terms are used only for the purpose of distinguishing one component from another component.

Terms used in the present application are used only to describe specific embodiments and are not intended to limit the present invention. Singular expressions include plural expressions unless clearly otherwise indicated in the context. It should be understood in the present application that terms such as "include" or "have" are intended to indicate that there are features, numbers, steps, operations, components, parts, or combinations thereof that are described in the specification and do not exclude, in advance, the possibility of the presence or addition of one or more other features, numbers, steps, operations, components, parts, or combinations thereof.

Hereinafter, embodiments of a twisted string actuator according to the present invention will be described in detail with reference to the accompanying drawings, and in description with reference to the accompanying drawings, the same or corresponding components are designated by the same reference numerals, and a duplicate description thereof will be omitted.

Figure 1:
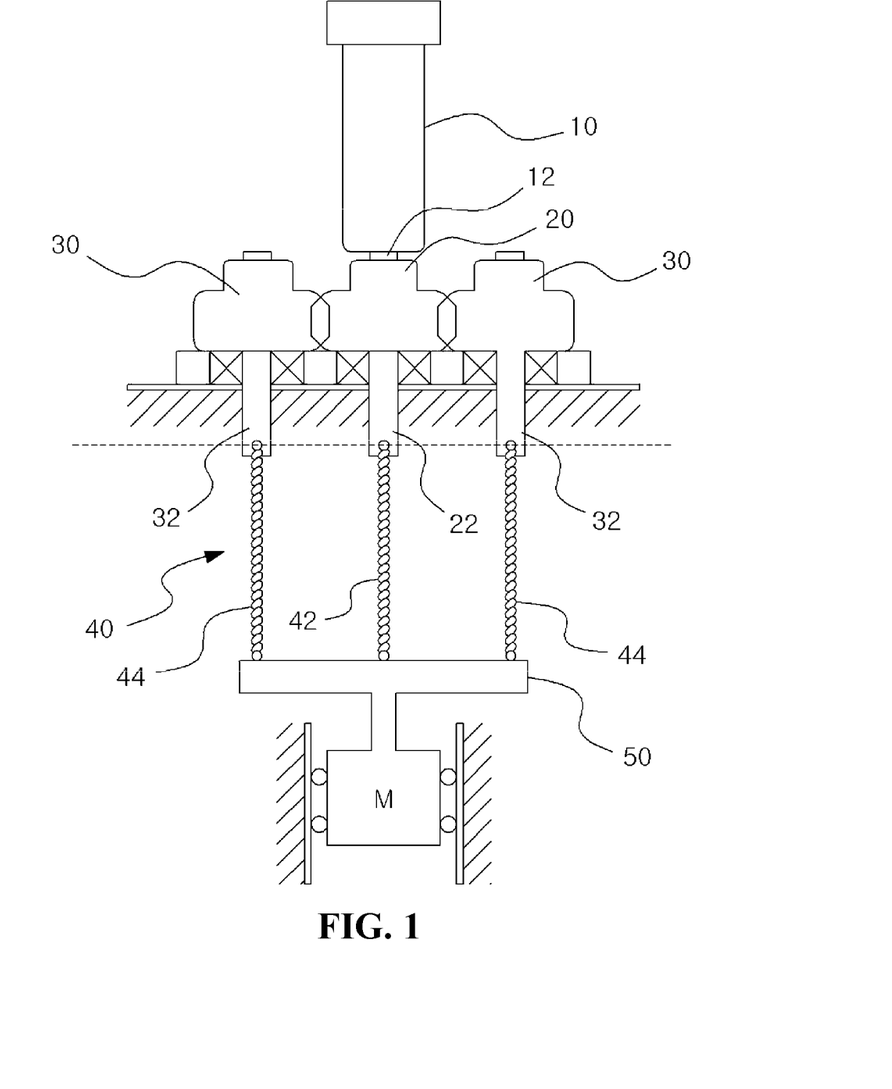
FIG. 1 is a view illustrating a mechanism of a twisted string actuator according to an embodiment of the present invention.
Figure 2:
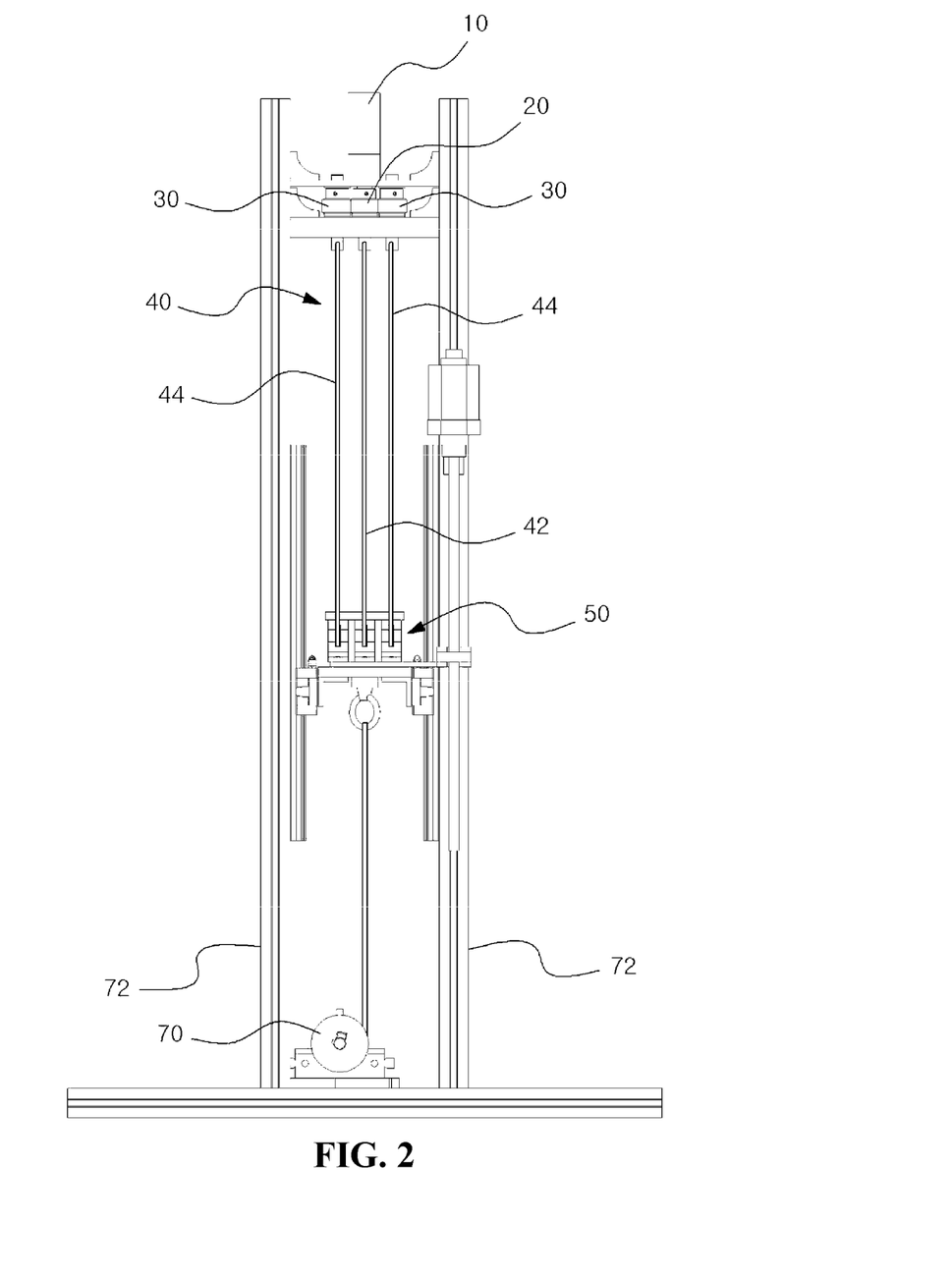
FIG. 2 is a view illustrating the twisted string actuator according to the embodiment of the present invention.
Figure 3:
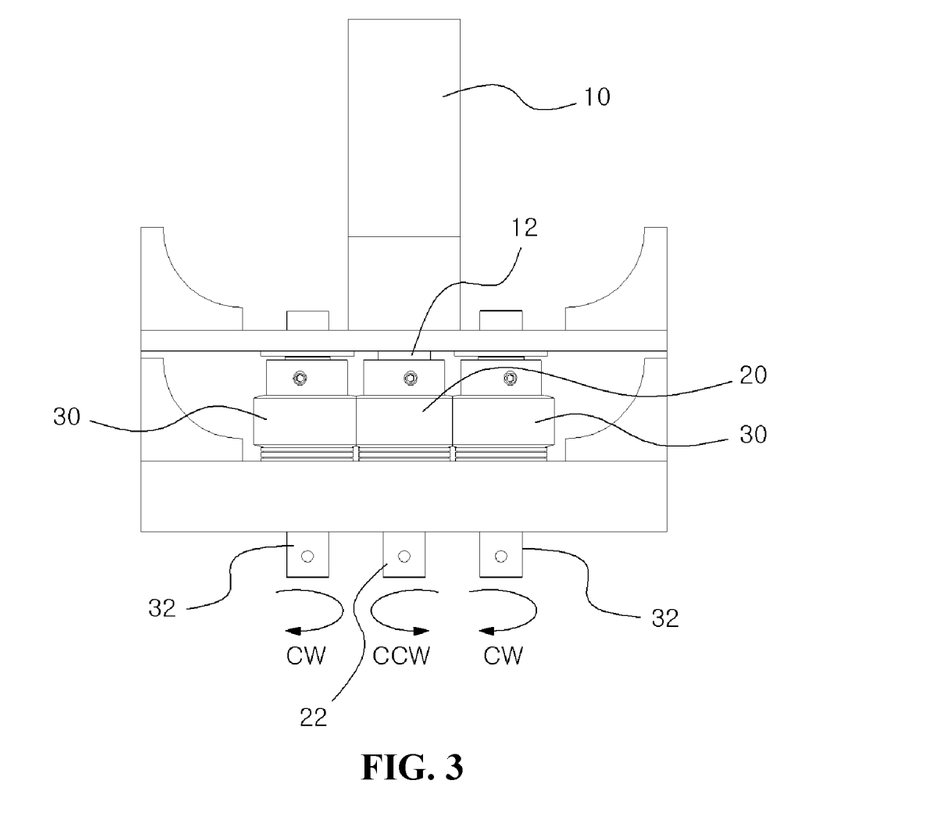
FIG. 3 is a view illustrating rotational directions of three strings installed in the twisted string actuator.
Figure 4:
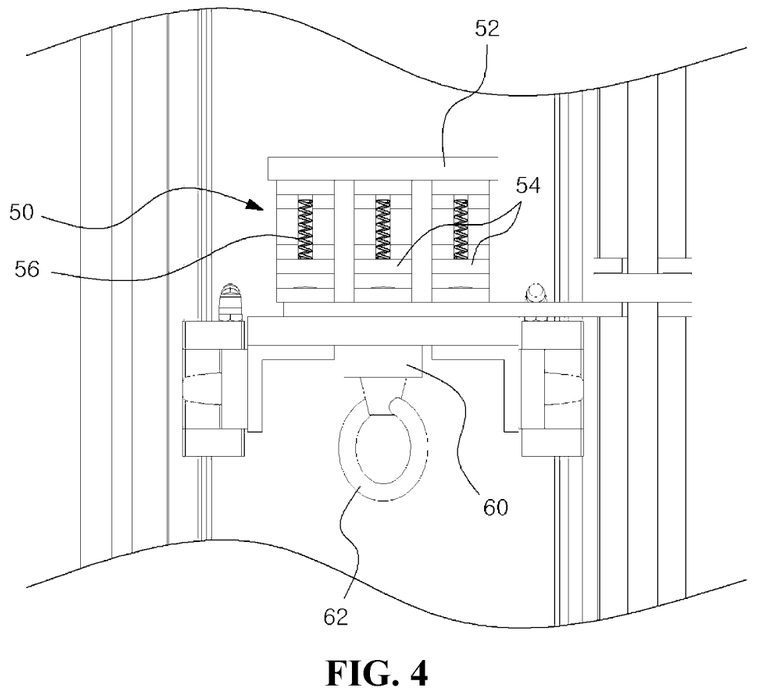
FIG. 4 is a view illustrating an elastic member installed in a driven part of the twisted string actuator.
Figure 5:
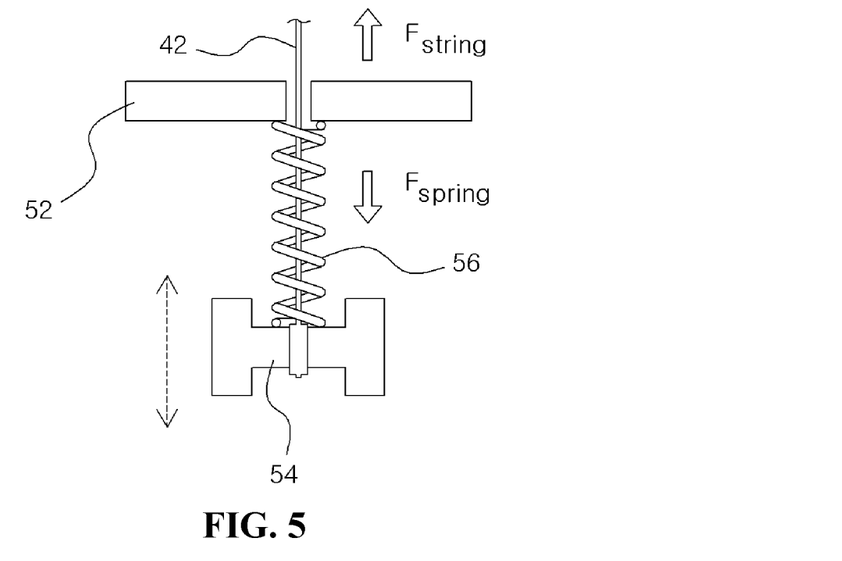

FIG. 1 is a view illustrating a mechanism of a twisted string actuator according to an embodiment of the present invention, FIG. 2 is a view illustrating the twisted string actuator according to the embodiment of the present invention, FIG. 3 is a view illustrating a rotational direction of three strings installed in the twisted string actuator, and FIG. 4 is a view illustrating an elastic member installed in a driven part of the twisted string actuator.

As illustrated, the twisted string actuator according to the present invention may include: a driving source 10; a driving part 20 that receives power from the driving source 10; a driven part 30 that is installed to be interlocked with the driving part 20 and receives the power; a string 40 connected to an end of the driven part 30 to be twisted or untwisted; and a driving compensation unit 50 installed at an end of the string 40.

A direct current (DC) motor or the like may be used as the driving source 10 which provides power for twisting the string 40. An output shaft 12 rotated in one direction by driving the driving source 10 is provided on one side of the driving source 10.

The driving part 20 is a part that is to be interlocked with the output shaft 12 to receive power from the driving source 10. Various devices that may transmit power may be used as the driving part 20. Hereinafter, an example of a gear will be mainly described. That is, a driving gear may be used as the driving part 20, and a driven gear engaged with the driving gear may be used as the driven part 30 that is to be interlocked with the driving part 20 to receive power. As will be described below, the driving part 20 and the driven part 30 may each be a device such as a pulley rather than a gear.

Referring to FIG. 1, in the present embodiment, one driving part 20 is disposed in the center, the pair of driven parts 30 are arranged on both sides of the driving part 20, and the driving part 20 and the driven parts 30 are configured as the driving gear and the driven gear. Arrangement of the driving part 20 and the driven parts 30 is illustrated in FIG. 1, but the present invention is not limited thereto, and various arrangement examples will be described below with reference to FIGS. 5 to 8.

In the existing twisted string actuator, when trying to increase a reduction ratio of the string 40, a method of increasing the length of the string 40 or reducing the radius of the string 40 is used. Since the reduction ratio is proportional to the length of the string 40 and inversely proportional to the square of the radius, the effect of the radius is greater. Thus, when the twisted string actuator having the above-described structure is used, the reduction ratio may be increased by reducing the radius of the string 40.

In other words, when the radius of the string 40 is reduced, the number of the strings 40 is reduced, and thus it is difficult to satisfy an allowable load condition. However, when the present actuator is used, since the actuator is driven in the form of a bundle, the allowable load condition of the actuator is satisfied, and thus the actuator may be safely driven. As a result, the twisted string actuator may be miniaturized, and an application range of the twisted string actuator is widened. That is, in the existing twisted string actuator, a selection range of the reduction ratio is narrow due to the constraints according to the requirements of the robot. However, when the present actuator is used, by combining the length of the radius of the string 40 to obtain a desired reduction ratio, the selection range of the reduction ratio may be widened.

The above-described number of bundles (the number of the driving part and the driven parts) may increase or decrease according to an allowable load of the twisted string actuator.

A driving member 22 and a driven member 32 are provided at ends of the driving part 20 and the driven part 30, respectively. As illustrated in FIG. 1, the driving member 22 and the driven member 32 extend from lower ends of the driving part 20 and the driven part 30 by a predetermined length, and the string 40 is connected to each end thereof. The string 40 may be connected through holes formed at ends of the driving member 22 and the driven member 32. The driving member 22 and the driven member 32 are not necessarily provided, and the string 40 may be directly connected to the driving part 20 and the driven part 30.

The string 40 includes a driving string 42 connected to the end of the driving member 22 and a driven string 44 connected to the end of the driven member 32. The driving string 42 and the driven string 44 are installed in a pre-twisted state to transmit a driving force while being repeatedly twisted and untwisted. In this case, the driving string 42 and the driven string 44 are installed while being twisted in opposite directions so as to transmit the power in the same direction. Referring to FIG. 3, since the driving string 42 is rotated in a counterclockwise direction and a pair of driven strings 44 are rotated in a clockwise direction, the driving string 42 and the driven strings 44 are installed while being twisted in opposite directions.

In more detail, the driving string 42 and the driven string 44 are twisted or untwisted in one direction by receiving power by the rotation of the driving part 20 and the driven part 30. When the driving part 20 and the driven part 30 are configured as the driving gear and the driven gear, since the rotation directions of the driving part 20 and the driven part 30 are opposite to each other, the driving string 42 and the driven string 44 should be installed while twisted in opposite directions so that the twisting and releasing of the string are performed in the same direction. In this way, since the string 40 may be manufactured according to the rotation directions of the driving part 20 and the driven part 30, the driving characteristics of the string 40 may be uniformly compensated for.

In the above description, it has been described that the driving string 42 and the driven string 44 are installed in a state of being twisted in opposite directions. However, it is assumed that the driving part 20 and the driven part 30 are installed as in FIG. 1. Therefore, when the arrangement becomes different, the twisted directions of the driving string 42 and the driven string 44 may become different. What is important is that the driving string 42 and the driven string 44 should be twisted and untwisted in the same direction while being to be interlocked with the operation of the driving part 20 and the driven part 30.

One ends of the driving string 42 and the driven string 44 are connected to the driving member 42 and the driven member 44, and the other ends thereof are connected to the driving compensation unit 50. The driving compensation unit 50 functions to compensate for the non-uniform driving of the driving string 42 and the driven string 44 to uniformly distribute the load acting on the actuator and functions to control the actuator by measuring the load acting on the actuator.

In more detail, even when made of the same material, the driving string 42 and the driven string 44 are twisted and untwisted slightly differently from each other according to the difference in characteristics of the material itself, the degree of the twisting, and the like. This difference may be small under small loads, but as the loads increases, this difference may cause a problem that the driving characteristics become ununiform. Thus, in the present embodiment, the ends of the driving string 42 and the driven string 44 are connected to the driving compensation unit 50 to compensate for this difference.

Referring to FIG. 4, the driving compensation unit 50 may include: a first support plate 52 through which the driving string 42 and the driven string 44 pass; a second support plate 54 which is installed to be spaced apart from the first support plate 52 and to which the ends of the driving string 42 and the driven string 44 are fixed; and an elastic member 56 that has both ends supported between the first support plate 52 and the second support plate 54, is provided to surround the driving string 42 and the driven string 44, and provides an elastic force in a direction in which the driving string 42 and the driven string 44 are untwisted.

The elastic member 56 provides the elastic force in the opposite direction (releasing direction) when the driving string 42 and the driven string 44 are twisted and pulled upward. That is, when the string 40 has different characteristics and is twisted with a slight deviation, the actuator may be driven ununiformly. The elastic member 56 compensates for this ununiform driving so that the string 40 may be uniformly driven. Further, when being designed by selecting an appropriate stiffness coefficient, the elastic member 56 may also function to alleviate an external impact or the like. A compression spring or the like may be used as the elastic member 56.

The driving compensation unit 50 is merely presented as an example and may also be applied to other types of devices in which the elastic member 56 may be supported.

The driving compensation unit 50 includes a sensing unit 60 provided below the second support plate 54. The sensing unit 60 is connected to a rod motor 70 through a string connected to a ring 62 formed at a lower portion thereof. The sensing unit 60 is a part of detecting the load acting on the actuator, and when the load is detected by the sensing unit 60, the reduction ratio of the string 40 or characteristics of the actuator may be identified through the detected load. For example, a rod cell or the like may be used as the sensing unit 60.

For reference, reference numeral 72 is a guide rail on which the twisted string actuator is installed and serves to guide both sides of the driving compensation unit 50 to vertically slide.

Hereinafter, it will be described with reference to FIGS. 6 to 9 that the twisted string actuator according to the present invention includes various arrangements of bundles.

Figure 6:
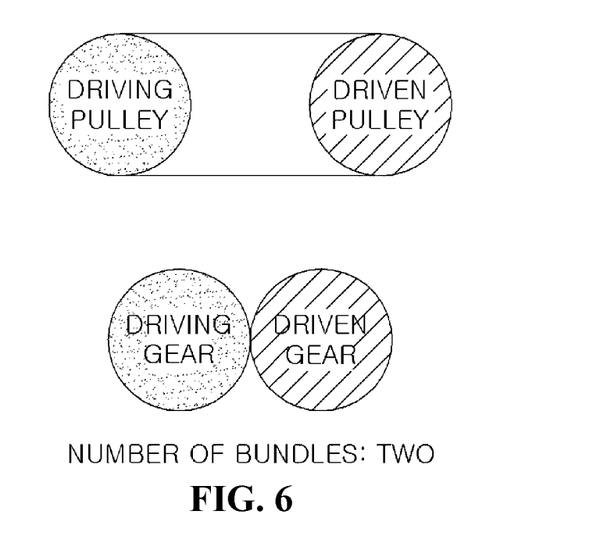
FIG. 6 is a view illustrating an exemplary case in which the twisted string actuator includes two bundles.

Referring to FIG. 6, when the twisted string actuator includes two bundles (one driving part and one driven part), the twisted string actuator may include a driving gear and a driven gear engaged with the driving gear. Further, the actuator may include a driving pulley and a driven pulley connected by a belt.

Figure 7:
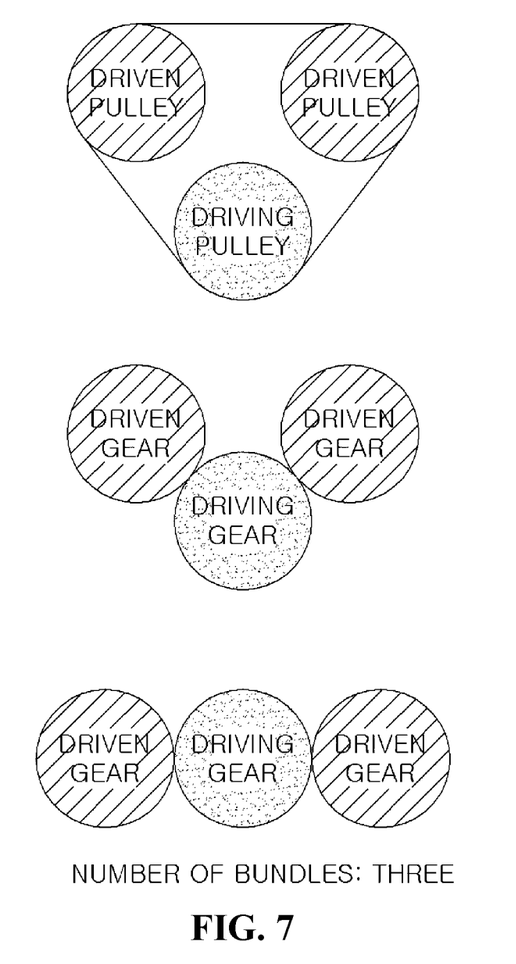
FIG. 7 is a view illustrating an exemplary case in which the twisted string actuator includes three bundles.

Referring to FIG. 7, when the twisted string actuator includes three bundles (one driving part and two driven parts), the twisted string actuator may include one driving gear and a driven gear engaged with both sides of the driving gear. In this case, the three bundles may be arranged in one direction or may be arranged in a triangular shape. Further, the actuator may include a driving pulley and a driven pulley connected by a belt.

Figure 8:
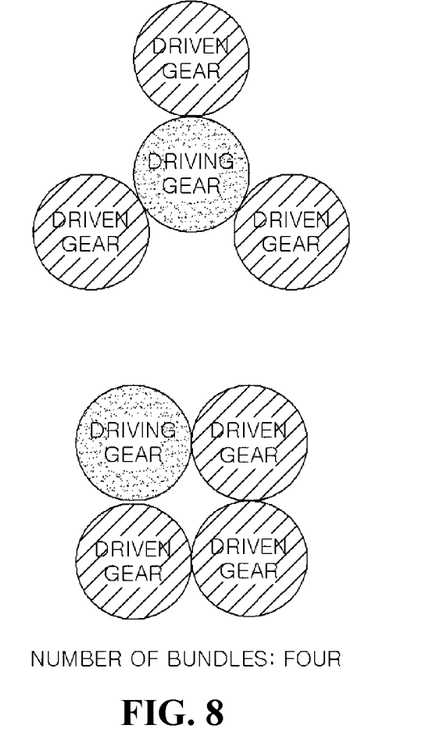
FIG. 8 is a view illustrating an exemplary case in which the twisted string actuator includes four bundles.

Referring to FIG. 8, when the twisted string actuator includes four bundles (one driving part and three driven parts), three driven gears may be arranged to have the same center angle radially with respect to the driving gear or the driving gear, and the driven gears may be arranged in a quadrangular shape.

Figure 9:
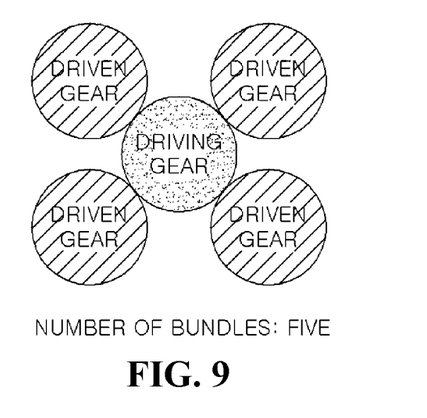
FIG. 9 is a view illustrating an exemplary case in which the twisted string actuator includes five bundles.

Referring to FIG. 9, when the twisted string actuator includes five bundles (one driving part and four driven parts), four driven gears may be arranged to have the same center angle of 90 degrees with respect to the driving gear.

Although the specific embodiments of the present invention have been described above, those skilled in the art may understand that the present invention may be variously modified and changed without departing from the spirit and scope of the present invention described in the appended claims.

The invention claimed is:

1. A twisted string actuator comprising:
   a driving source having an output shaft;
   a driving part that receives power from the driving source, wherein the driving part is a driving gear connected to the output shaft configured for rotation;
   a driven part that is installed to be interlocked with the driving part and receives the power from the driving part, wherein the driven part is a pair of driven gears arranged on both sides of the driving gear and engaged with the driving gear, and the pair of driven gears includes a first driven gear and a second driven gear;
   a string that is connected to the driving part and the driven part to be twisted or untwisted, wherein the string comprises a driving string and a driven string; and
   a driving compensator that is installed at an end of the string and compensates for ununiform driving of the string,
   wherein the driving string is connected to an end of the driving gear,
   wherein the driven string includes a first driven string coupled to an end of the first driven gear and a second driven string coupled to an end of the second driven gear, and wherein the driving compensator includes:
a first support plate through which the driving string, the first driven string, and the second driven string pass,
a plurality of second support plates which are installed to be spaced apart from the first support plate and to which the driving string, the first driven string, and the second driven string are fixed, respectively, and
an elastic member is provided for each of the driving string, the first driven string and the second driven string with one end of each elastic member supported by the first support plate and another end of each elastic member is supported by respective second support plates, and each elastic member provides an elastic force in a direction in which the driving string, the first driven string, and the second driven string is untwisted.

2. The twisted string actuator of claim 1, wherein the driving string connected to the end of the driving gear is installed in a state of being twisted in a direction opposite to the first driven string connected to the end of the first driven gear and the second driven string connected to the end of the second driven gear.

3. The twisted actuator of claim 1, wherein the driving string connected to an end of the driving part and the driven string connected to an end of the driven part are installed in a pretwisted state so that twisting and releasing occur in the same direction.

4. The twisted string actuator of claim 3, wherein the driving string and the driven string are installed in a state of being twisted in opposite directions.

5. The twisted string actuator of claim 1, wherein the driving compensator includes an elastic member that provides an elastic force in a direction in which the string is untwisted.

6. The twisted string actuator of claim 1, wherein the driving compensator includes a sensor to detect a load acting on the string.

7. The twisted string actuator of claim 1, wherein the driven part is to be interlocked with the driving part and is disposed radially with respect to the driving part.

* * * * *